United States Patent [19]

Arvizu

[11] 4,279,221
[45] Jul. 21, 1981

[54] TIMED FOOD DISPENSER FOR ANIMALS

[76] Inventor: Oscar O. Arvizu, 438 E. 246th Pl., Carson, Calif. 90745

[21] Appl. No.: 142,106

[22] Filed: Apr. 21, 1980

[51] Int. Cl.$^3$ ............................................. A01K 5/02
[52] U.S. Cl. ............................................. 119/51.11
[58] Field of Search ................ 119/51.11, 51 R, 51.5, 119/56 R; 307/141.4

[56] References Cited

U.S. PATENT DOCUMENTS

| 3,648,660 | 3/1972 | Esquiral | 119/51.11 |
| 4,055,146 | 10/1977 | Smrt | 119/51.11 |

Primary Examiner—Hugh R. Chamblee
Attorney, Agent, or Firm—William C. Babcock

[57] ABSTRACT

An elongate vertically extending housing that defines a hopper in the upper portion, a downwardly inclined chute in the lower part of the housing, and a time operated motor driven rotatable food dispenser disposed between the hopper that periodically by gravity receives food from the hopper and discharges the same into the chute, with the intermittent energization of the motor being by a simple, inexpensive electric circuit. The dispenser is of such structure that granules of food from the hopper cannot lodge between the dispenser and chute structure with which it is operatively associated to cause the dispenser to bind and become inoperative. A food receiving dish is provided that removably interlocks with a lower portion of the housing, with the dish being easily disengaged from the housing for cleansing purposes.

2 Claims, 5 Drawing Figures

TIMED FOOD DISPENSER FOR ANIMALS

BACKGROUND OF THE INVENTION

1. Field of the Invention

Timed food dispenser for animals.

2. Description of the Prior Art

In the past, numerous automatically operated food dispensers have been devised for the feeding of animals, particularly dogs. Such devices have had the operational disadvantages that they were of an unduly complicated mechanical structure, were heavy and cumbersome, had a tendency for granules of food being dispensed to lodge in the time-operated mechanism of the feeder and render the same inoperative, and were so expensive that they had limited appeal to the portion of the public that had use for such feeders.

A major object of the present invention is to provide a timed food dispenser for animals that is substantially free of the above mentioned operational disadvantages, and has the further advantage of being of such simple mechanical structure that it requires little or no maintenance and may be sold at a sufficiently low price as to encourage the widespread use thereof.

Another object of the invention is to provide a device for automatically feeding animals a predetermined quantity of food at predetermined timed intervals, and with the electric circuit used in periodically actuating the invention being of an extremely simple design, low cost, and one that requires a minimum of maintenance attention.

These and other operational advantages of the present invention will become apparent from the following detailed description thereof.

SUMMARY OF THE INVENTION

The animal feeder includes an elongate vertically extending housing that has a hopper defined in the upper portion thereof, a downwardly and forwardly extending chute is provided in the lower part of the housing. Intermediately disposed between an opening in the hopper through which feed may flow by gravity, and a rearward portion of the chute is a rotatable food dispenser that intermittently by a timer is caused to rotate substantially one hundred and eighty degrees. The dispenser includes two oppositely disposed receptacles of desired volumes. When the dispenser is actuated, one of the receptacles has by gravity been filled with food that is completely dispensed to the chute after the dispenser has rotated through one hundred and eighty degrees. During this rotation the other of the receptacles has moved to a position to receive food by gravity from the opening in the hopper.

The rotatable dispenser is of such structure that granules of food falling from the hopper cannot lodge between the rotatable dispenser and the supporting frame as to cause the dispenser to bind in the frame and become inoperative.

DESCRIPTION OF THE PREFERRED EMBODIMENT

Figure 1:
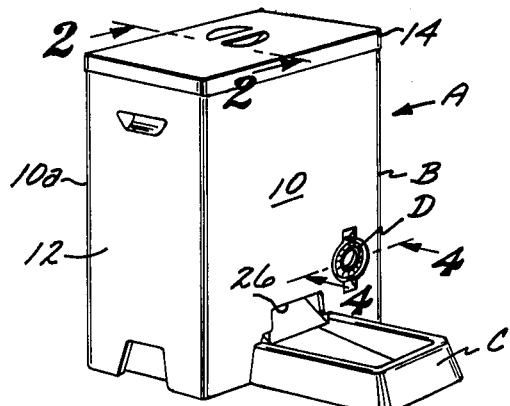
FIG. 1 is a perspective view of the dispenser.
Figure 4:
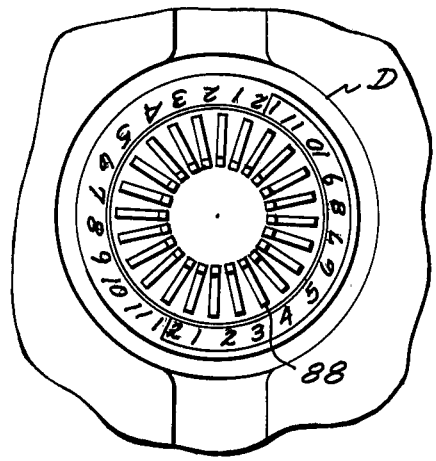
FIG. 4 is a front elevational view of the timer.
Figure 2:
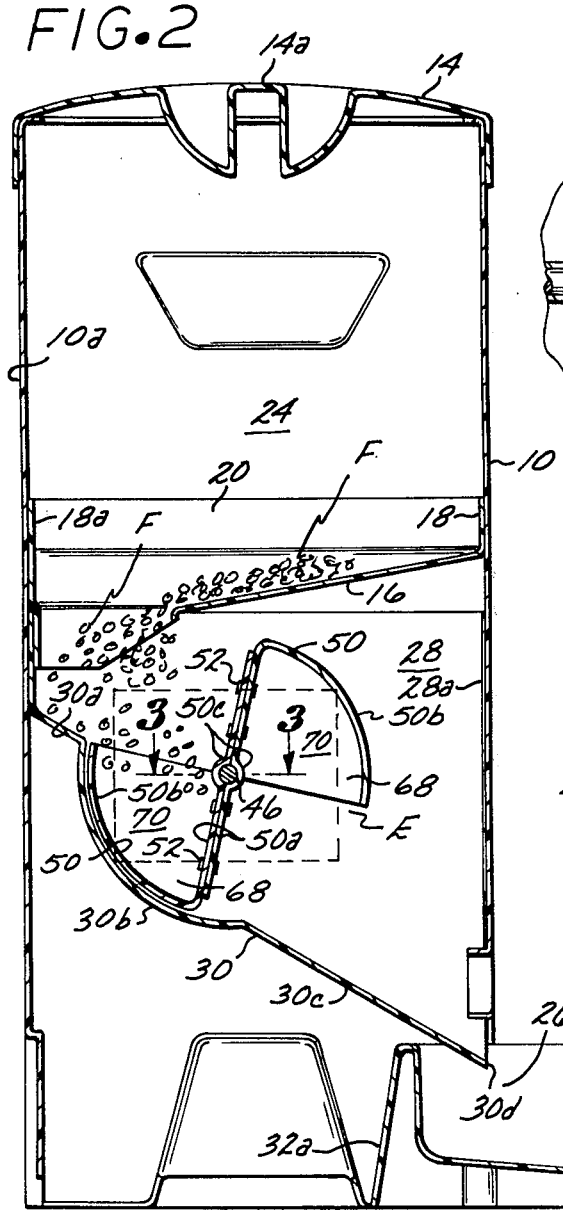
FIG. 2 is a longitudinal cross-sectional view of the device taken on the line 2—2 of FIG. 1.

The timed food dispenser for animals A as may best be seen in FIG. 1 includes an elongate vertically extending housing B that is preferably of rectangular transverse cross-section and formed from sheet material of a rigid material such as light weight metal or plastic. The housing B as may be seen in FIG. 2 has an open top through which feed of a grannular nature is introduced into the housing. The housing B includes a first and second side wall 10 and 10a that is shown in FIG. 2 and a pair of end walls 12. The upper portion of the housing B is closed by a cover 14 that slidably engages the upper portion of the side walls 10, 10a and the pair of end walls 12. The cover is preferably formed with a pair of spaced recesses that define a hand grip 14a therebetween.

A downwardly and rearwardly extending partition 16 is provided and disposed within the housing B intermediate the top and bottom thereof, with the partition having forward and rearward side pieces 18 and 18a extending upwardly therefrom, and the side pieces being joined by a pair of end pieces 20. The side pieces 18 and 18a and pair of end pieces 20 are in abutting contact with the interior surfaces of the side walls 10 and 10a and end walls 12, and serve to hold the partition at a fixed position within the interior of the housing B. The partition has a centered opening 22 in the rearward portion thereof as shown in FIG. 2, and the partition in cooperation with the upper portion of the housing serving to define a hopper 24 into which food F may be discharged when the cover 14 is removed from the housing. The food F is of a dried grannular nature and one that will flow by gravity through the centered opening 26.

A pair of parallel laterally spaced side members 28 are vertically disposed within the housing and extend forwardly from the opening 22, with the forward edges of the walls secured to the side wall 10 as shown in FIG. 2. The side piece 18a on the lower end thereof as may be seen in FIG. 2 merges into a first downwardly and forwardly extending sheet member 30a, which on its forward edge develops into an arcuate shaped section 30b, with the arcuate section on its forward end developing into a downwardly and forwardly extending portion 30c as best seen in FIG. 2, with the extremity of the portion 30c defining a downwardly extending protuberance. The walls 28, and the portions 30a, 30b, and 30c, above described, cooperate to define a chute 30 situated within the confines of the housing B, and the chute in communication with a rectangular opening 26 formed in the lower portion of the forward side walls 10 as shown in FIG. 1.

A food dish C is provided as best seen in FIG. 2 which includes first and second end walls 32 and 32a that slope downwardly in opposite directions, and are connected by a pair of side walls 34 that slope downwardly in the same manner. The end walls 32 and 32a as well as the side walls 34 develop on the upper portions into section 36, that extend inwardly and develop into a downwardly extending dish 38 that has a forwardly extending bottom 40. The dish C as can best be seen in FIG. 2 by being tilted and then being returned to a horizontal position, may be caused to interlock with the downwardly extending portion 30d of the housing to receive food F from the feeder A as will later be described.

Figure 5:
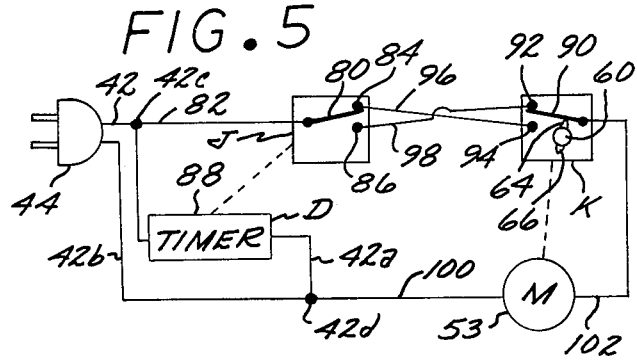
FIG. 5 is a diagrammatic view of the electric circuit used in the invention.

A conventional timer D is provided that is electrically operated, and as may be seen in FIG. 1 is mounted on the forward portion of the housing. The timer D is of conventional structure and is commercially available. The timer is supplied with electrical energy through conductors 42 and 42b, junction point 42d, and 42a as shown in FIG. 5, which conductors are connected to a pronged plug 44 that may be inserted into a domestic power outlet. A food dispenser E is rotatably supported within the confines of the housing and intermediate the openings 22 and the chutes 30. The food dispenser E includes two J-shaped members 50 as may best be seen in FIG. 2, with each member being defined by a first leg 50a, a second arcuate shaped leg 50b, and the first leg having a semi-circular section 50c formed in an intermediate position therein. The two J-shaped members have the first legs 50a in back to back relationship as shown in FIG. 2 with the semi-circular sections 50c extending around the shaft 46. A number of bolts 52 or screws, extend through the first legs 50a and when tightened cause the section 50c to frictionally grip the shaft 46.

Figure 3:
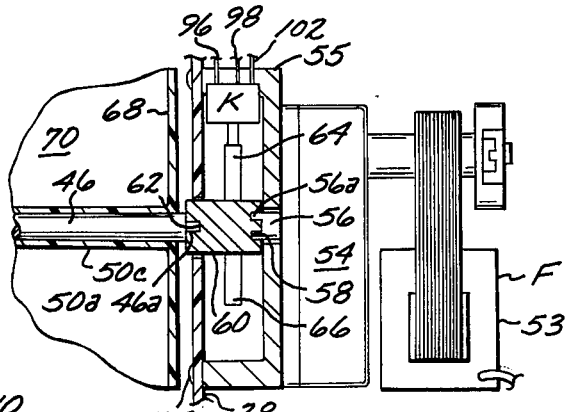
FIG. 3 is a fragmentary transverse cross-sectional view of the device taken on the line 3—3 of FIG. 2.

The shaft 46 is intermittently rotated 180 degrees by the power assembly F shown in FIG. 3. The power assembly F includes an electric motor 53 that drives a gear box 54 from which a drive shaft 56 extends. The gear box is secured to a frame member 55 that is secured to one of the walls 28 by screws 55 or the like. The gear box 54 has the drive shaft 56 extending therefrom, which drive shaft on the free ends has a number of spaced members 56a projecting outwardly therefrom that engage recesses 58 formed in a connector 60. The connector 60 when rotated also causes rotation of the shaft 46, due to the shaft having a key 46a projecting therefrom that engages a recess 62 formed in the connector. The connector has a pair of rigid outwardly extending and oppositely disposed cam members 64 and 66 secured thereto, which cam members are operatively associated with a second electric switch K later to be described. The dispenser E has quadrant-shaped pairs of walls 68 secured to the edges of the second legs B and portions of the first legs 50a and these walls in combination with the members 30 serving to provide two oppositely disposed receptacles 70 as shown in FIG. 2 in which the food F is periodically discharged.

The electric circuit H used in actuating the dispenser E to rotate substantially one hundred and eighty degrees for food F in one of the receptacles 70 to be discharged onto chute member 30, with the other receptacle 70 moving into a position to receive food from hopper 24, is shown in FIG. 5.

Electric circuit H includes first and second single pole, double throw switches J and K. Switch J includes a spring-loaded electrical conducting blade 80 that by an electrical conductor 82 is connected to junction point 42c in conductor 42. Switch J includes two spaced contacts 84 and 86. Blade 80 at all times tends to remain in engagement with contact 84. When one of the actuating lugs 88 on timer D that has been manually moved to an actuating position contacts blade 80, the blade is moved from engagement with first contact 84 to engagement with second contact 86 where it will so remain until lug 88 of timer T moves out of an actuating position.

Second switch K includes a spring-loaded electrical conducting blade that may engage either a first contact 92 or second contact 94, but due to the spring loading at all times tends to remain in engagment with contact 94. First contact 84 of first switch J is connected by a conductor 96 to second contact 94 of second switch K. Second contact 86 of first switch J is connected by a conductor 98 to first contact 92 of second switch K. When one of the cam members 64 or 66 engages second blade 90, the second blade 90 will be moved from engagement with second contact 94 of second switch K to engagement with first contact 92 and will so remain until motor E rotates shaft 56 and connector 56a to the extent that one of the members 64 and 66 is no longer in such engagement. An electrical conductor 100 is connected to junction point 42d and a terminal of motor E, and the other terminal of the motor having a conductor 102 extending therefrom to second blade 90.

The rotation of the food dispenser E through one hundred eighty degrees takes place in two stages. The first phase is a ten degree partial rotation and takes place when lug 88 of the timer dial actuates blade 80 to engage second contact 86 of the first switch J. Electric current flows from plug 44 through conductors 82, blade 80 through contact 86 first switch on through lead 98 with contact 92, blade 90 of second switch through lead 102 through the motor 5 using leads 100 and 42b to return to plug 44.

Disengagement of the first phase is accomplished when the motor 53 has moved the cam members 64 and 66 to a position ten degrees off zero degree reference. This allows the blade 90 on second switch K to return to normal engagement with contact 94. Since this causes the electrical circuit H to open, the motor 53 stops and is not activated until the timer D goes through its second stage of operation.

The second phase of its rotation is accomplished when the actuating lug 88 on the timer dial releases blade 80 of the first switch J to engage contact 84. This action completes the electrical circuit for motor 53. Electric current flows from plug 44 through conductor 82, blade 80 through contact 84 of the first switch J on through lead 96 to contact 94, blade 90 of the second switch K, through lead 102 to motor 53 and returning to the plug 44 through leads 100, junction point 42d, and 42b.

A de-energized state is finally accomplished when a one hundred eighty degree of a rotation has been completed. This is accomplished by either members 64 or 66 reaching zero degree position as shown in FIG. 5 which pushes blade 90 of the second switch K to engagement with first contact 92.

The use and operation of the invention has been described previously in detail and need not be repeated.

What is claimed is:

1. An automatic animal feeding apparatus of the type that includes an elongate upwardly extending housing that has first and second side walls, a pair of end walls; a transverse rearwardly and downwardly sloping partition in said housing that cooperates with the upper portion of the latter to define a hopper in which feed may be stored, said partition having an opening therein adjacent said second side wall; a downwardly and forwardly extending chute in said housing disposed below said partition, said chute having an arcuate shaped section in the lower portion thereof, said chute in communication with an opening in the lower portion of said first side wall, said apparatus being characterized by including:

a. a food dispenser that includes first and second oppositely disposed receptacles capable of each holding a predetermined quantity of said food;
b. a shaft to which said food dispenser is secured;
c. first means for so rotatably supporting said shaft within said housing that said dispenser is disposed between said hopper and chute, with each of said receptacles capable of being disposed in a first position where said feed can flow downwardly by gravity through said opening from said hopper into said receptacle by gravity, and said dispenser capable of being subsequently rotated through substantially one hundred and eighty degrees to a second position where said receptacle filled with said food is inverted and said food discharges into said chute to slide downwardly by gravity to the exterior of said housing;
d. an electric motor that drives said shaft;
e. an electrically operated timer that includes a plurality of lugs, each of said lugs capable of being disposed in an actuating position;
f. first and second oppositely disposed members that rotate concurrently with said shaft;
g. first and second single pole, double throw electric switches, each of said switches including first and second spaced contacts and a spring-loaded blade, said blade of said first switch at all times tending to be in engagement with said first contact and moving into engagement with said second contact of said first switch when engaged by the one of said lugs of said timer that is in an actuating position, said blade of said second switch at all times tending to be in engagement with said second contact and moving into engagement with said first contact of said second switch when engaged by one of said oppositely disposed members; and
h. an electric circuit of which said timer, electric motor, and first and second switches form a part, said electric circuit capable of being supplied electric power from a domestic source, said electric circuit including a first electrical conductor that connects said first contact of said first switch and second contact of said second switch, a second electrical conductor that connects said second contact of said first switch and said first contact of said second switch, said dispenser rotating through said one hundred and eighty degrees in first and second stages, said first stage being initiated when one of said members moves said blade of said first switch into engagement with said second contact thereof and said blade of said second switch is held in engagement with said first contact of said second switch, said first stage of rotation of said dispenser terminating when said member in engagement with said blade of said second switch has rotated to the extent said blade of said second switch moves into engagement with said first contact of said second switch, and said second stage of rotation being initiated when said actuating log of said timer moves to the extent that said blade of said first switch moves into engagement with said first contact of said first switch to complete said electric circuit through said first electrical conductor and second contact and blade of said second switch, with said second stage terminating after said dispenser has rotated substantially one hundred and eighty degrees one of said members breaks said electric circuit by moving said blade of said second switch out of engagement with said second contact of said second switch and into engagement with said first contact thereof.

2. An automatic animal feeding apparatus as defined in claim 1 in which said dispenser includes:
i. a pair of J-shaped members of substantial width, each of said members including a first leg that has a semi-circular section intermediate the ends thereof, a second arcuate leg that extends outwardly from one end of said first leg, a pair of quadrant shaped walls that extend between the sides of said second leg and portions of the sides of said first leg, said walls and first and second legs cooperating to define a feed receiving receptacle, said pairs of members having said first legs adjacently disposed and said semi-circular sections extending about said shaft, and said receptacles oppositely disposed; and
j. a plurality of bolts that engage said first legs and draw them together for said semi-circular sections to frictionally engage said shaft and prevent said J-shaped members rotating relative thereto.

* * * * *